Patented June 13, 1933

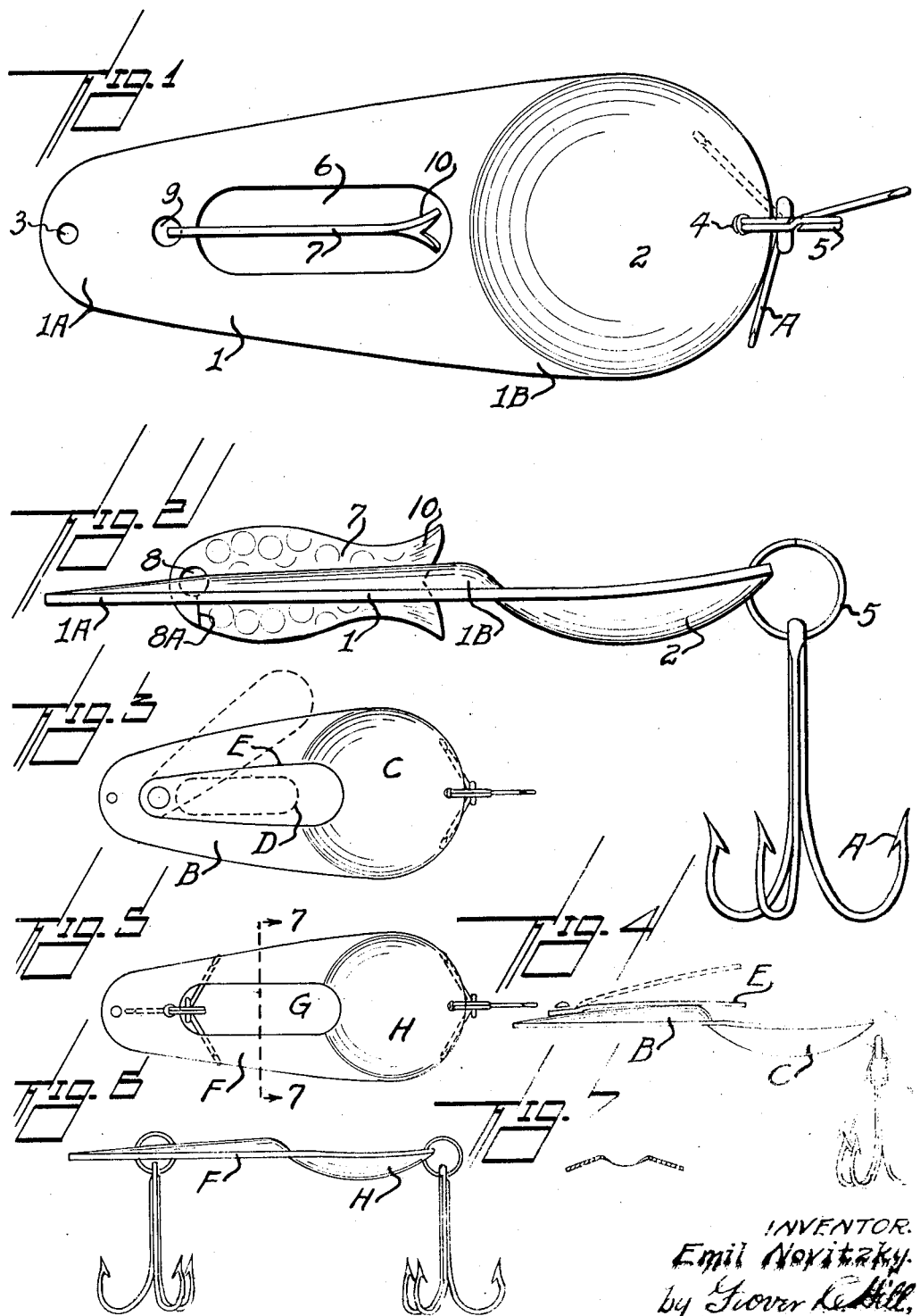

1,914,211

UNITED STATES PATENT OFFICE

EMIL NOVITZKY, OF DETROIT, MICHIGAN

FISH LURE

Application filed October 3, 1932. Serial No. 635,947.

There are of course a great variety of fish lures and hook devices, but my invention relates to that class known as the spoon type, and the object in view is primarily to design a spoon-like lure that is provided with means to prevent the same from revolving in the water, and otherwise being so designed as to embody additional advantages.

Another object of the invention is that the design thereof efficiently permits the invention to wobble in the water, a life-like action which is necessary in the art of the manufacture of fishing devices.

The invention possesses still further advantages, all of which will become readily apparent during the course of the following detailed description, illustrated throughout the accompanying drawing, and more specifically pointed out in the appended claims.

With reference to the drawing:

Figures 1 and 2 are greatly enlarged views; Figure 1 is a top plan view of the complete invention, and Figure 2 is a side elevation of the same.

Figure 3 is a top plan view of a modified form of the invention and Figure 4 is a side elevation of the same.

Figure 5 is a top plan view of an additional modified form of the invention and Figure 6 is a side elevation of the same.

Figure 7 is a section taken substantially upon line 7—7 of Figure 5.

With reference to Figures 1 and 2, which illustrate the major structure of the invention, the same comprises body portion 1, which begins at the position 1A and tapers in angular raised formation to the position at 1B, as shown in Figures 2 and 7. The said 1B portion of the device terminates in bowl portion 2, as indicated.

Aperture 3 is provided for connecting with the line, and aperture 4 being provided for ring 5 to which is secured the customary hooks A.

The most important feature of the invention is the elongated slotted opening 6, which is clearly shown in Figure 1. Within the said opening is fish-like fin 7, one end of which is drilled as at 8 and the hole split as at 8A to engage aperture 9. Fin 7 is also provided with tail-like end 10. The said fin will be permitted to wobble as the device wobbles in the water, which is an added feature in effecting life-like motion in a device of this character.

The importance of slotted opening 6 is that the same permits the water to pass through the device, thus preventing the same from revolving, yet not affecting the wobbling qualities of the device. If the device completely revolves in the water the line quickly becomes twisted or tangled and is almost unmanageable. This is the common difficulty in practically speaking all fishing devices of the spoon type.

The form of the invention shown in Figures 3 and 4 has body B with bowl C, slot D and fin E. The action of the said fin is shown by the dotted lines in Figures 3 and 4.

The form shown in Figures 5 and 6 has body F, slot G and bowl portion H, as indicated.

While the invention as shown in Figures 1 and 2 is preferable in construction, probably there would be equal advantage and result obtained from the construction shown in Figures 3, 4, 5 and 6.

Having thus described my invention, what I claim as new is:

1. A fish lure having a tapering body portion which terminates in a bowl shaped end, said body portion being provided with a longitudinal slot, a member having one end pivotally secured at the forward end of the slot and being free to wobble therein.

2. A fish lure having a tapered body portion, said body portion comprising front and rear portions, the sides of the front portions being inclined downwardly from the longitudinal axis of the lure, said front portion being also provided with a longitudinal slot, a member having one end pivotally secured at the forward end of the slot for free movement therein and the rear portion terminating in a bowl shaped depression.

In testimony whereof I hereunto affix my signature.

EMIL NOVITZKY.